April 29, 1958 — H. W. GOOSMANN — 2,832,648
TRESTLES
Filed June 25, 1956 — 2 Sheets-Sheet 1

INVENTOR.
Herman W. Goosmann
BY
Attorney.

April 29, 1958 H. W. GOOSMANN 2,832,648
TRESTLES.
Filed June 25, 1956 2 Sheets-Sheet 2
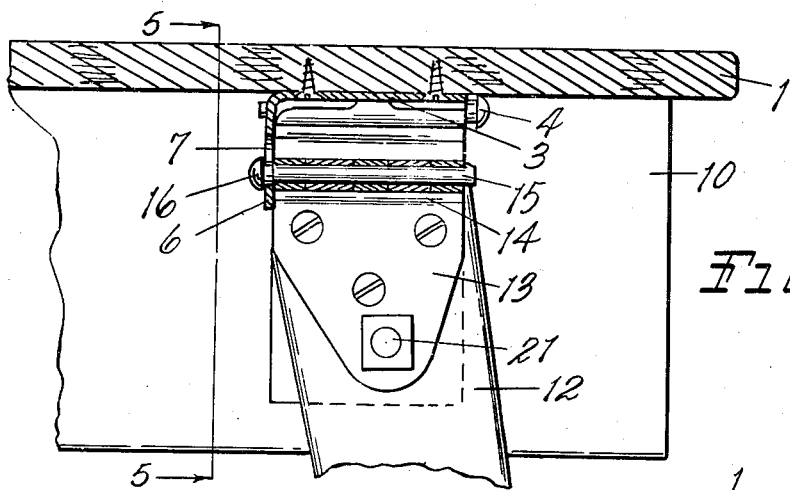
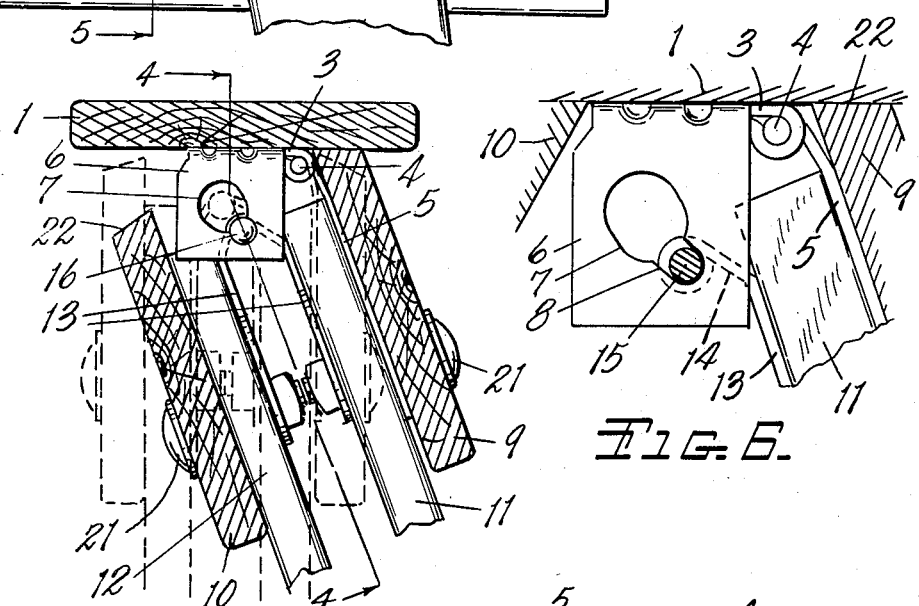
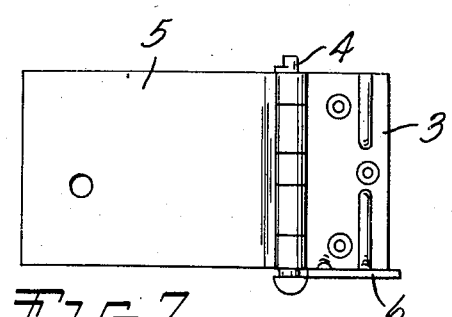
INVENTOR.
Herman W. Goosmann
BY
Attorney.

ent Office 2,832,648
Patented Apr. 29, 1958

2,832,648

TRESTLES

Herman W. Goosmann, Grand Rapids, Mich.

Application June 25, 1956, Serial No. 593,602

5 Claims. (Cl. 304—5)

This invention relates to improvements in trestles. More particularly the invention relates to an improvement in the trestle disclosed and claimed in Patent No. 2,412,395, issued December 10, 1946.

The principal objects of this invention are:

First, to provide a collapsible trestle or sawhorse which is easily assembled with all of the interlocking parts of the trestle in proper relation.

Second, to provide a collapsible trestle which can be partially assembled with all permanent screw connections completed and later fully assembled by the simple expedient of attaching four bolts through pre-drilled holes in the partially assembled parts.

Third, to provide a collapsible trestle having hingedly connected legs and a leg supporting rail separately hingedly connected to a top bar in which the collapsible connection between the top bar and the legs is solidly and permanently determined by bolts extending through the metal leaves of the hinges that connect the legs and the hinges that connect the top bar to the legs.

Fourth, to provide a collapsible trestle or sawhorse which may be erected into a solid supporting structure and which can be easily and economically assembled either completely or partially for compact shipment in partially assembled form.

Other objects and advantages of the invention will be apparent from a consideration of the following description and claims. The drawings of which there are two sheets illustrate a highly practical form of the trestle.

Fig. 4 is a fragmentary vertical longitudinal cross sectional view taken along the plane of the line 4—4 in Fig. 3 and showing the parts in assembled erected position.

Fig. 5 is a fragmentary transverse cross sectional view similar to Fig. 3 but showing the parts in partially collapsed position as viewed from a plane indicated by the line 5—5 in Fig. 4.

Fig. 6 is an enlarged fragmentary transverse cross sectional view illustrating the locking engagement between the pin of the hinges connecting the legs and the locking ear on the hinges that connect the legs to the top of the trestle.

Fig. 7 is a plan view of one of the hinges which connect the legs and leg rails to the top bar of the trestle.

Figure 1:
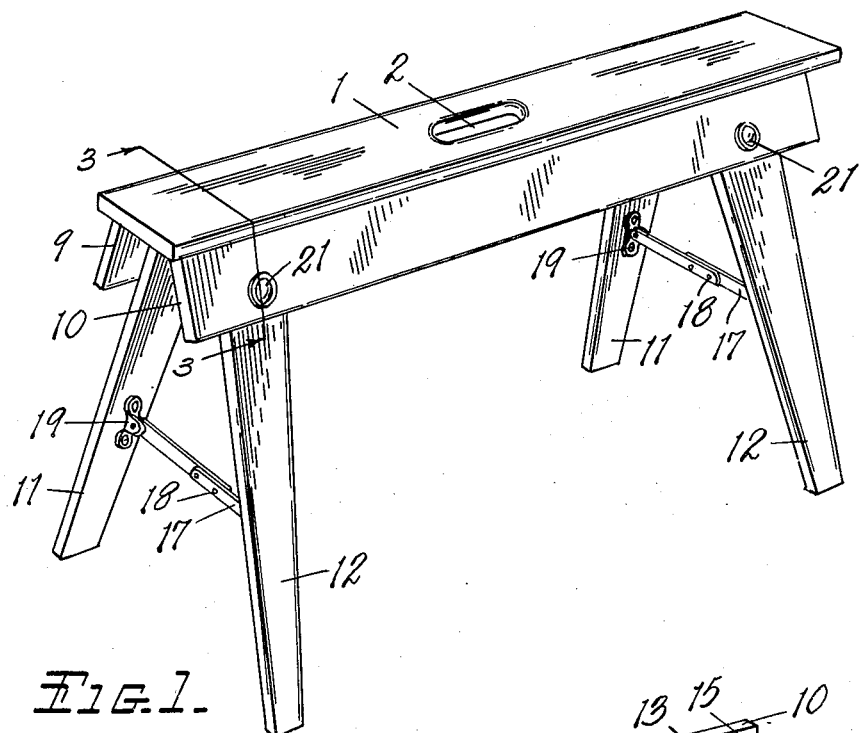
Fig. 1 is a perspective view of the assembled trestle in erected operative position.

The trestle comprises a top bar 1 in the form of a flat board of the desired weight and thickness to support the type of load that the trestle is designed to support. The top bar has a central hand hole 2 for convenience in carrying the trestle. Attached to the under side of the top bar toward each end thereof are a pair of hinges having a first hinge leaf 3 screwed to the top bar with the hinge pins 4 extending longitudinally along the underside of the top bar in laterally offset relation to the center line of the top bar. The other leaves 5 of the hinges depend swingably below the top bar. At their longitudinally inner ends the hinge leaves 3 are provided with perpendicularly depending ears 6 having key hole apertures 7 formed therein. The apertures 7 have reduced portions or notches 8 extending downwardly and laterally toward the side of the hinge leaves 3 on which the hinge pins 4 are mounted. The top bar 1 and the hinges 3—5 constitute a subassembly of the trestle as will be more fully explained.

The top bar 1 of the trestle is supported by collapsibly connected leg rails 9 and 10 and attached legs 11 and 12. The legs 11 and 12 are arranged in pairs that are permanently and pivotally connected together by the leaves of hinges 13. Desirably the leaves of the hinges 13 are downwardly angled as at 14 and have hinge pins 15 with headed ends 16 projecting from their ends toward the ears 6. Toward their lower ends the legs of each pair of legs 11 and 12 are adjustably connected by folding braces 17 hingedly connected in the center as at 18 and having their ends pivotally connected to attaching brackets 19 on the legs. The pairs of legs 11 and 12 with their hinges 13 and braces 17 constitute further subassemblies of the trestle.

Figure 3:
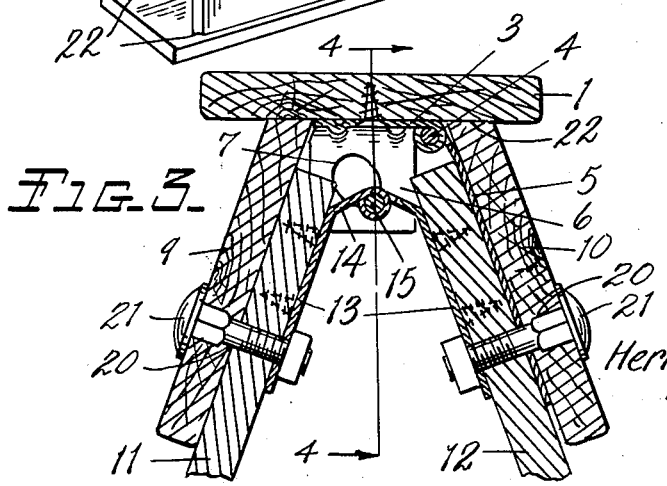
Fig. 3 is a fragmentary transverse cross sectional view of the erected trestle taken along the plane of the line 3—3 in Fig. 1.

The leg rails 9 and 10 are flat boards having holes 20 formed in their ends and receiving the heads of carriage bolts 21. The carriage bolts 21 are passed through holes provided therefore in the hinge leaves 5 and the upper ends of the legs 11 and 12 and the leaves of the hinges 13. Desirably the upper edges of the leg rails are beveled as at 22 to abut the underside of the top bar 1 in symmetrical downward divergent relation as shown in Fig. 3. The leg rails 9 and 10 with the holes 20 formed therein and the carriage bolts 21 with their coacting nuts constitute the remaining sub-assemblies or connecting parts of the trestle.

The holes 20 in the legs 11 and 12 and the hinges 13 that receive the carriage bolts 21 are equidistant from the hinge pins 15 so that the carriage bolts 21 in each pair of legs 11 and 12 are aligned when the hinges 13 are collapsed. The holes 20 in the leg rail 10 are spaced from the upper edge 22 thereof so that the upper edge abuts the top bar when the hinge leaves 5 are opened and so that the headed ends 16 of the pivots 15 swing in an arc about the hinge pins 4 that passes through the key hole apertures 7 and the reduced portion 8 thereof. When each pair of legs 11 and 12 and their connecting hinge 13 are collapsed about the bolts 21 into a plane parallel to the ears 6 the headed ends 16 on the hinge pins 15 may be swung in a longitudinally plane through the top rail into the key hole apertures 7. Subsequent lateral opening motion of the legs and the connecting hinges 13 and 3—5 will swing the headed ends 16 into locking engagement in the reduced portions 8 of the key hole apertures and will swing the beveled upper edges of the leg rails 9 and 10 into abutting engagement with the underside of the top bar as shown in Fig. 3.

Figure 2:
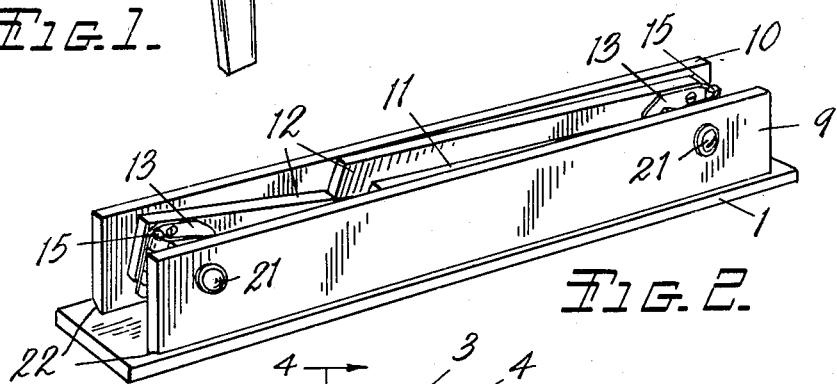
Fig. 2 is a perspective view of the trestle in assembled and collapsed inverted position.

In the collapsed portion of the hinges 3—5 and 13 the legs 11 and 12 are collapsed into parallel relation and can be swung in longitudinal planes about the bolts 21 to nested position between the leg rails as illustrated in Fig. 2 for ease of carrying and compact storage of the trestle. For further compactness in shipment of the trestle the carriage bolts 21 can be removed so that the pairs of legs and their connecting hinges 13 and the top bar 1 with the hinges 3—5 connected thereto and the leg rails 9 and 10 can be closely packed in sub-assembly form. The purchaser of a partially assembled trestle has only to install and tighten the carriage bolts 21 and since the holes for the carriage bolts can be pre-formed in the proper position the final assembly and erection of the trestle by the purchaser must be accurate.

Having thus described the invention, what is claimed as new and is desired to be secured by Letters Patent is:

1. In a trestle having pairs of legs connected by first hinges and a top bar with leg rails extending along each side thereof, one leg rail being connected to the top bar by second hinges and the other leg rail being connected to one leg of each pair of legs by first pivot bolts extending through the legs and the other leg rail and the leaves of the first hinges connected to said one leg of each pair of legs, the leaves of said second hinges secured to said top bar having depending flanges with key hole slots therein, the novel combination comprising second pivot bolts passed through said one leg rail and a leaf of each of said second hinges and constituting the sole connection between said one leg rail and said second hinges, said second pivot bolts also extending through the other legs of each pair of legs and the hinge leaf of said first hinges secured thereto, said first and second pivot bolts being disposed in alined pairs when said first hinges are closed, and headed studs on the ends of the pivots of said first hinges engageable in said key hole slots, said first and second hinges being disposed in overlapping relation when their pivot axes are parallel.

2. In a trestle having pairs of legs connected by first hinges and a top bar with leg rails extending along each side thereof, one leg rail being connected to the top bar by second hinges and the other leg rail being connected to one leg of each pair of legs by first pivots extending through the legs and the other leg rail and the leaves of the first hinges connected to said one leg of each pair of legs, the leaves of said second hinges secured to said top bar having depending flanges with key hole slots therein, the novel combination comprising second pivots passed through said one leg rail and a leaf of each of said second hinges and constituting the connection between said one leg rail and said second hinges, said second pivots also extending through the other legs of each pair of legs and the hinge leaf of said first hinges secured thereto, said first and second pivots being disposed in alined pairs when said first hinges are closed, and headed studs on the ends of the pivots of said first hinges engageable in said key slots, said first and second hinges being disposed in overlapping relation when their pivot axes are parallel.

3. In a trestle having pairs of legs connected by first hinges and a top bar with leg rails extending along each side thereof, one leg rail being connected to the top bar by second hinges and the other leg rail being connected to one leg of each pair of legs by first pivots extending through the legs and the other leg rail, the leaves of said second hinges secured to said top bar having depending flanges with key hole slots therein, the novel combination comprising second pivots passed through said one leg rail and a leaf of each of said second hinges and constituting the connection between said one leg rail and said second hinges, said second pivots also extending through the other legs of each pair of legs and the hinge leaf of said first hinges secured thereto, said first and second pivots being disposed in alined pairs when said first hinges are closed, and headed studs on said first hinges engageable in said key hole slots, said first and second hinges being disposed in overlapping relation when their pivot axes are parallel.

4. A hinge assembly adapted to be used in pairs to collapsibly connect the top bar, leg rails and four legs of a trestle comprising a first hinge having one leaf with fastener receiving holes therein and a downturned flange on one end with a keyhole slot therein eccentric to the pivot of the hinge, a second leaf pivoted to said first leaf and having a bolt receiving hole formed therein in substantially spaced relation to the pivot between the leaves, a second hinge having lateral bends formed in each leaf near the pivot of the hinge whereby the leaves beyond the bends are swingable into spaced parallel relation, the leaves of said second hinge having fastener receiving holes formed therein and having second bolt receiving holes formed toward the outer ends thereof in opposed equally spaced distance from the pivot of the second hinge, the distance of said bolt hole in said second leaf from the pivot of said first hinge being greater than the distance of said bolt holes in said second hinge from the pivot thereof, and a headed stud on the end of the pivot of said second hinge deposed at a radius from said second bolt holes equal to a radius from said first bolt hole through the plane of said flange at the level of the enlarged portion of said keyhole slot.

5. A hinge assembly adapted to be used in pairs to collapsibly connect the top bar, leg rails and four legs of a trestle comprising a first hinge having one leaf with fastener receiving holes therein and a downturned flange on one end with a keyhole slot therein eccentric to the pivot of the hinge, a second leaf pivoted to said first leaf and having a bolt receiving hole formed therein in substantially spaced relation to the pivot between the leaves, a second hinge having lateral bends formed in each leaf near the pivot of the hinge whereby the leaves beyond the bends are swingable into spaced parallel relation, the leaves of said second hinge having fastener receiving holes formed therein and having second bolt receiving holes formed toward the outer ends thereof in opposed equally spaced distance from the pivot of the second hinge, the distance of said bolt hole in said second leaf from the pivot of said first hinge being greater than the distance of said bolt holes in said second hinge from the pivot thereof, and a headed stud on the end of said second hinge disposed at a radius from said second bolt holes equal to a radius from said first bolt hole through the plane of said flange at the level of the enlarged portion of said keyhole slot.

References Cited in the file of this patent

UNITED STATES PATENTS 2,412,395    Goosmann    Dec. 10, 1946